(12) United States Patent
Fenny et al.

(10) Patent No.: US 7,461,812 B2
(45) Date of Patent: Dec. 9, 2008

(54) ROTORCRAFT CONTROL SYSTEM WITH STEPPED MIXING LINKAGE

(75) Inventors: Carlos A. Fenny, Arlington, TX (US); Duane Hicks, Marietta, OK (US)

(73) Assignee: Bell Helicopter Textron Inc., Forth Worth, TX (US)

( * ) Notice: Subject to any disclaimer, the term of this patent is extended or adjusted under 35 U.S.C. 154(b) by 346 days.

(21) Appl. No.: 10/528,906

(22) PCT Filed: Sep. 19, 2003

(86) PCT No.: PCT/US03/28974

§ 371 (c)(1),
(2), (4) Date: Feb. 10, 2006

(87) PCT Pub. No.: WO2004/028901

PCT Pub. Date: Apr. 8, 2004

(65) Prior Publication Data
US 2006/0186262 A1 Aug. 24, 2006

(51) Int. Cl.
*B64C 27/52* (2006.01)
(52) U.S. Cl. .................. 244/17.25; 416/23; 416/24; 416/112; 244/83; 244/17.11
(58) Field of Classification Search .............. 244/17.25, 244/17.11, 234, 220, 99.2, 99.3; 74/491, 74/469; 416/23, 24, 48, 155, 101, 112
See application file for complete search history.

(56) References Cited

U.S. PATENT DOCUMENTS

| | | | | |
|---|---|---|---|---|
| 2,731,215 A | | 1/1956 | Avery .......................... 224/17 |
| 2,829,721 A | * | 4/1958 | Gebhard ....................... 416/24 |
| 3,031,017 A | * | 4/1962 | Arcidiacono ................. 416/114 |
| 3,096,045 A | * | 7/1963 | Hendrickson et al. .... 244/17.11 |
| 3,106,964 A | * | 10/1963 | Danielson et al. ............. 416/18 |
| 3,109,496 A | * | 11/1963 | Ellis, III et al. ................ 416/24 |
| 3,118,504 A | * | 1/1964 | Cresap ........................... 416/1 |
| 3,199,601 A | * | 8/1965 | Dean et al. .................. 416/112 |
| 3,217,809 A | * | 11/1965 | Bossler, Jr. .................. 416/112 |
| 3,228,478 A | * | 1/1966 | Edenborough .............. 416/112 |
| 3,332,643 A | * | 7/1967 | Toner .......................... 244/7 R |
| 3,799,695 A | * | 3/1974 | Yamakawa ................... 416/40 |
| 3,866,857 A | * | 2/1975 | Ciastula .................... 244/17.25 |
| 3,908,399 A | * | 9/1975 | Durno et al. ............. 244/17.25 |
| 3,971,536 A | * | 7/1976 | Rollins, Jr. .................. 244/230 |
| 3,999,726 A | * | 12/1976 | Carlson et al. .............. 244/221 |
| 4,025,230 A | * | 5/1977 | Kastan ......................... 416/18 |
| 4,059,247 A | * | 11/1977 | Prewitt ....................... 244/7 R |
| 4,062,508 A | * | 12/1977 | Stephens et al. ............ 244/234 |
| 4,134,560 A | * | 1/1979 | Messerschmidt ........... 224/234 |
| 4,245,956 A | * | 1/1981 | Frosch et al. ............... 416/114 |

(Continued)

Primary Examiner—Michael R. Mansen
Assistant Examiner—Brian M O'Hara
(74) Attorney, Agent, or Firm—James E. Walton

(57) ABSTRACT

A control system for a rotorcraft is disclosed. The control system includes a stepped mixing linkage, such that a selected amount of right-left lateral cyclic output is generated for certain amounts of forward-aft cyclic input. The stepped mixing linkage includes two supporting links and a floating link pivotally coupled between the two supporting links. The ratio of the lengths of the two supporting links to the length of the floating link is small, thereby generating a selected lateral sinusoidal output, a selected rotation of the sinusoidal output, and a selected ramped output in response to each forward-aft pilot input command.

16 Claims, 7 Drawing Sheets

U.S. PATENT DOCUMENTS

| | | | |
|---|---|---|---|
| 4,388,836 A * | 6/1983 | Allison | 74/41 |
| 4,667,909 A | 5/1987 | Curci | 244/234 |
| 4,697,986 A * | 10/1987 | David | 416/114 |
| 4,802,689 A * | 2/1989 | Hoffmann et al. | 280/124.1 |
| 5,058,825 A | 10/1991 | Rabouyt | 244/17.25 |
| 5,149,023 A * | 9/1992 | Sakurai et al. | 244/229 |
| 5,190,243 A * | 3/1993 | Guimbal | 244/17.25 |
| 5,727,757 A * | 3/1998 | Nyhus | 244/221 |
| 5,749,540 A * | 5/1998 | Arlton | 244/17.13 |
| 5,900,710 A * | 5/1999 | Gautier et al. | 318/675 |
| 6,254,037 B1 * | 7/2001 | Fenny et al. | 244/223 |
| 2007/0068303 A1 * | 3/2007 | Bouru | 74/469 |

* cited by examiner

ROTORCRAFT CONTROL SYSTEM WITH STEPPED MIXING LINKAGE

TECHNICAL FIELD

The present invention relates to control systems for rotorcraft.

DESCRIPTION OF THE PRIOR ART

The directional stability of light helicopters with four-bladed main rotors can be affected by a phenomenon known as "Cross-Coupling." Cross-Coupling causes a hovering helicopter to veer to the right or left when the pilot commands straight-forward or straight-backward flight. Once the helicopter has achieved forward or backward motion, however, the right or left pulling almost disappears.

Because the cross-coupling effect remains constant once forward or aft motion is achieved, i.e., not proportional with forward-aft cyclic position, installation of a proportional mixer cannot correct cross-coupling at higher speeds. To correct for cross-coupling, it is necessary for a mixer to add a selected left output value as the cyclic is moved forward out of hover, and then hold that value as the cyclic is moved to full forward. For aft flight, it is necessary for the mixer to add a selected right output value as the cyclic is moved aft out of hover and then hold that value as the cyclic is moved to full aft. The cross-coupling effect on four-bladed helicopters has been resolved using methods more complex and expensive than mechanical mixers and proportional mixers.

As is well known, some military helicopters are used as a weapon aiming platforms. Because such helicopters require a high degree of directional stability, they are typically equipped with Stability Augmentation Systems (SAS) that utilize gyros to sense aircraft motion, and a computer to direct hydraulic cylinders on the cyclic controls to maintain directional stability. These SAS systems are designed to negate the effect of turbulence on helicopter stability, and also function to correct the cross-coupling effect. The cost and complexity of SAS systems are acceptable for military helicopters, but are not commercially viable for light helicopters.

As a result, non-military, light helicopters typically use a stepped, shaped cam and linkage arrangement to correct the cross-coupling effect. The cam provides a programmed right or left cyclic output as the pilot moves the cyclic forward or aft. Cams, however, are one of the least preferred methods of providing programmed motion in aircraft control systems, because debris can foul the cam and its follower causing the controls to jam. To protect against jamming, the these helicopters must incorporate a spring cartridge to override the cam mechanism.

Thus, certain shortcomings remain in the area of addressing the cross-coupling effect in light helicopters and other rotorcraft.

SUMMARY OF THE INVENTION

Therefore, it is an object of the present invention to provide a method and apparatus for correcting the cross-coupling effect in helicopters and other rotorcraft.

It is another object of the present invention to provide a rotorcraft having a control system for correcting the cross-coupling effect.

These objects are achieved by providing a stepped mixing linkage in the control system, such that a selected amount of right-left lateral cyclic output is generated for certain amounts of forward-aft cyclic input. In the preferred embodiment, the stepped mixing linkage includes two supporting links and a floating link pivotally coupled between the two supporting links. The ratio of the lengths of the two supporting links to the length of the floating link is small, thereby generating a selected lateral sinusoidal output, a selected rotation of the sinusoidal output, and a selected ramped output in response to each forward-aft pilot input command.

The present invention provides significant advantages, including: (1) it is light weight; (2) it is resistant to jamming; and (3) it is cost effective.

Additional objectives, features and advantages will be apparent in the written description which follows.

BRIEF DESCRIPTION OF THE DRAWINGS

The novel features believed characteristic of the invention are set forth in the appended claims. However, the invention itself, as well as, a preferred mode of use, and further objectives and advantages thereof, will best be understood by reference to the following detailed description when read in conjunction with the accompanying drawings, wherein:

DESCRIPTION OF THE PREFERRED EMBODIMENT

Figure 1:
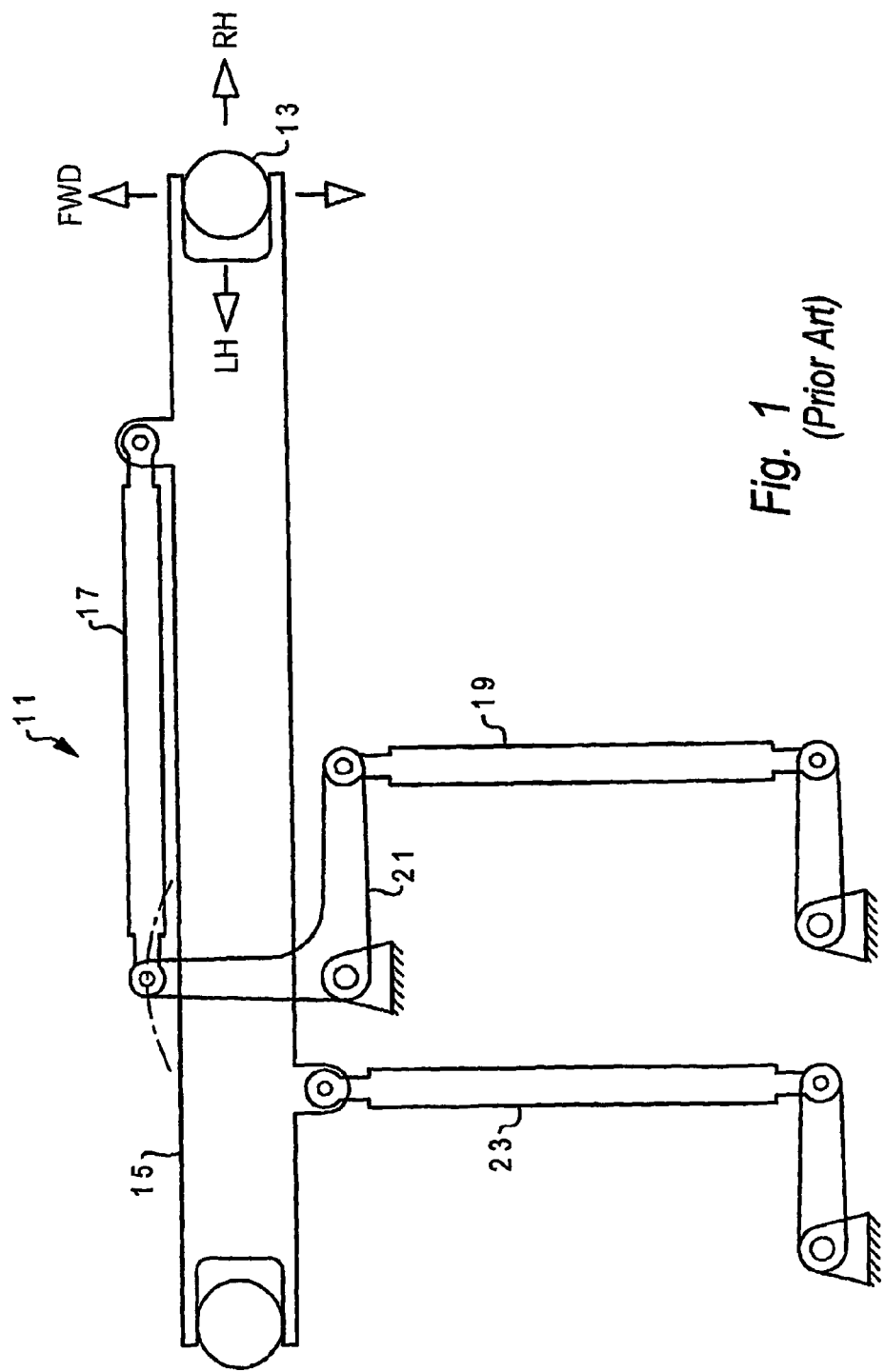
FIG. 1 is a schematic of a prior-art cyclic control system linkage.

Referring to FIG. 1 in the drawings, a prior-art helicopter cyclic control system linkage 11 is illustrated. In such systems, a pilot commands aircraft direction, i.e., forward-aft, left-right, by moving a cyclic 13 in the desired direction. Cyclic 13 is connected to a main rotor (not shown) through a system of bellcranks and links. For example, cyclic 13 is pivotally coupled to a torque tube 15. Torque tube 15 is pivotally coupled to a lateral output link 17, which is pivotally coupled to a left-right output link 19 via a bellcrank 21. Torque tube 15 is also pivotally coupled to a forward-aft output link 23. Moving cyclic 13 changes the pitch, i.e., angle, of the rotor blades, which causes the main rotor to tilt in the commanded direction.

It is possible for the influences of gyroscopic inertia, aerodynamics, and structural stiffness to combine to affect the predicted change of direction commanded by the cyclic. Moving the cyclic straight forward may cause the helicopter to veer left or right. Moving the cyclic back from full forward may cause the helicopter to speed up. Often these irregularities are considered minor when compared to the effects of turbulence and aircraft loading, and no design changes to the aircraft are necessary. However, if these irregularities become obtrusive to the pilot, changes to the rotor, transmission mounts, and control rigging are often required.

When changes to these components are ineffective or impractical, a device generically called a "mixer" may be installed. Mixers do not eliminate irregularities, instead they add the required left or right input to the rotor to counteract the irregularities and make them transparent to the pilot. Most mixers add left-right inputs to the rotor as the cyclic is moved forward-aft by mechanically linking the left-right and forward-aft controls. Usually these mixers are proportional. For example, 20% forward cyclic adds 2% left, 50% forward cyclic adds 5% left, 90% forward adds 9% left. The ratio of forward-aft to left-right varies from mixer to mixer as will the direction, i.e., left or right, added with forward cyclic.

As set forth above, the directional stability of light helicopters with four-bladed main rotors can be affected by a phenomenon known as "cross-coupling." Cross-Coupling causes a hovering helicopter to veer to the right or left when the pilot commands straight-forward or straight-backward flight. Once the helicopter has achieved forward or backward motion, however, the right or left pulling almost disappears.

Because the cross-coupling effect remains constant once forward or aft motion is achieved, i.e., it is not proportional with forward-aft cyclic position, installation of a proportional mixer cannot correct cross-coupling at higher speeds. To correct for cross-coupling it is necessary for a mixer to add a selected left output value as the cyclic is moved forward out of hover and then hold that value as the cyclic is moved to full forward. For aft flight it is necessary for the mixer to add a selected right output value as the cyclic is moved aft out of hover and then hold that value as the cyclic is moved to full aft.

Figure 2:
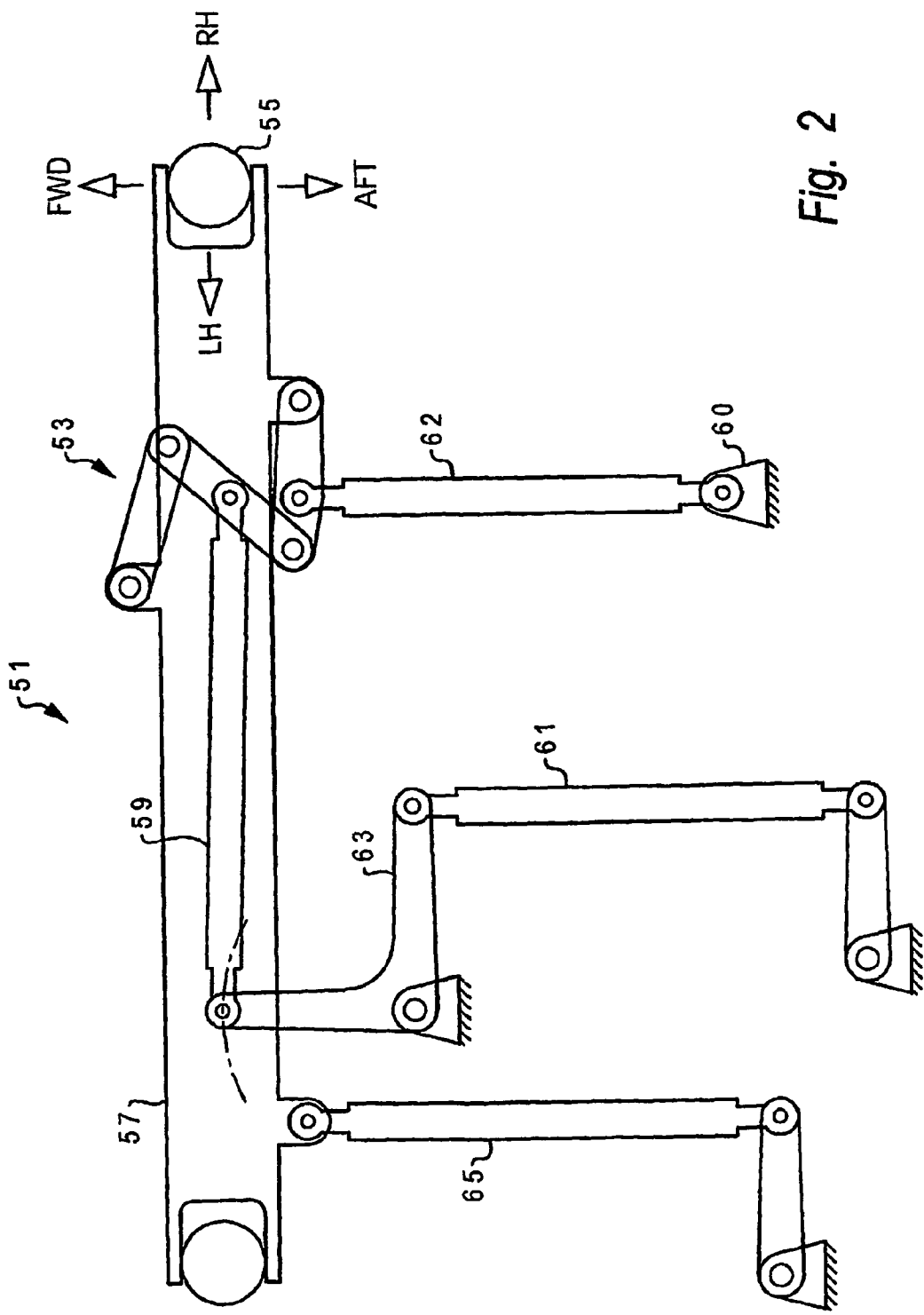
FIG. 2 is a schematic of a cyclic control system having a stepped mixing linkage according to the present invention.

Referring now to FIG. 2 in the drawings, a rotorcraft control system with stepped mixing linkage 51 according to the present invention is illustrated. Control system 51 corrects the cross-coupling effect by utilizing a unique stepped mixing linkage 53. Stepped mixing linkage 53 provides a method of producing a modified stepped mechanical output as a response to a linear mechanical input. Stepped mixing linkage 53 adds a selected amount of right-left lateral cyclic output for a certain amount of forward-aft cyclic input. This is accomplished without the use of cams, slides, electrical, or hydraulic devices.

Control system 51 includes a cyclic 55 for receiving directional commands from a pilot. Cyclic 55 is connected to a main rotor (not shown) through a system of bellcranks and links. Cyclic 55 is pivotally coupled to a torque tube 57. Torque tube 57 is pivotally coupled to a lateral output link 59 via stepped mixing linkage 53. Stepped mixing linkage 53 is grounded to a fuselage 60 by a ground link 62. Lateral output link 59 is pivotally coupled to a left-right output link 61 via a bellcrank 63. Torque tube 57 is also pivotally coupled to a forward-aft output link 65. Moving cyclic 55 changes the pitch of the rotor blades, which causes the main rotor to tilt in the commanded direction.

Figure 3:
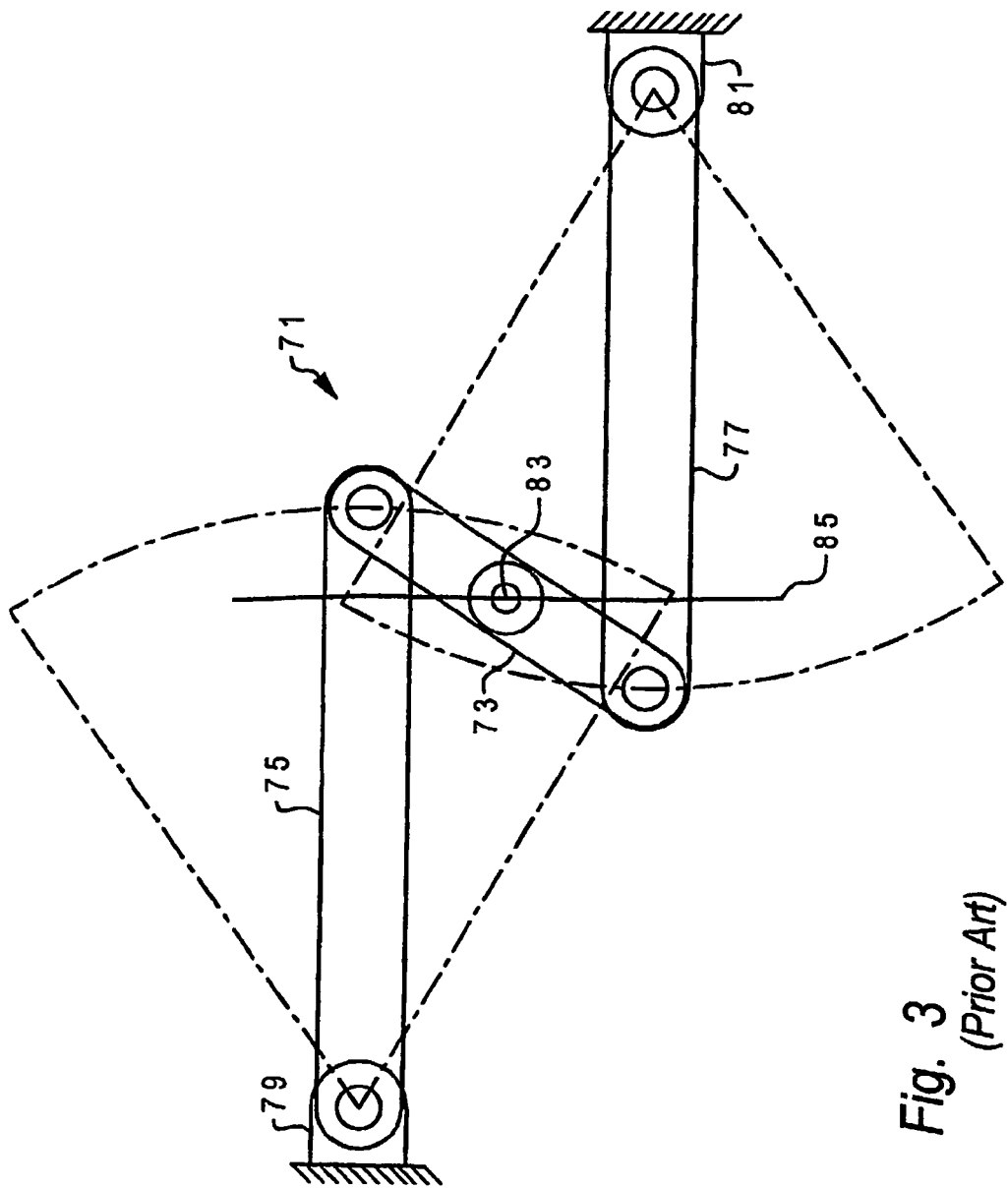
FIG. 3 is a schematic of a prior-art Watts linkage.

Referring now to FIG. 3 in the drawings, the sinusoidal output of a prior-art Watts linkage 71 is illustrated. Wafts linkages are commonly used to generate straight-line motion in mechanisms without the use of straight sliding surfaces. Watts linkage 71 includes a short floating link 73 supported by two much longer links 75 and 77, which are grounded on grounded pivots 79 and 81, respectively. Motion of a reference point 83 located at the center of floating link 73 is constrained to a straight line within limits before the motion of reference point 83 diverges, as is shown by line of motion 85.

These limits are defined by the ratio of the lengths of supporting links 75 and 77 to the length of floating link 73. The larger the ratio, the greater the amount of linear motion prior to diverging. Devices that utilize such Watts linkages to provide straight-line motion typically strive to make the ratio of the length of supporting links 75 and 77 to the length of floating link 73 as large as possible. On the other hand, stepped mixing linkage 53 is intentionally configured to make the ratio of the length of the supporting links to the length of the floating link as small as possible.

Figure 4:
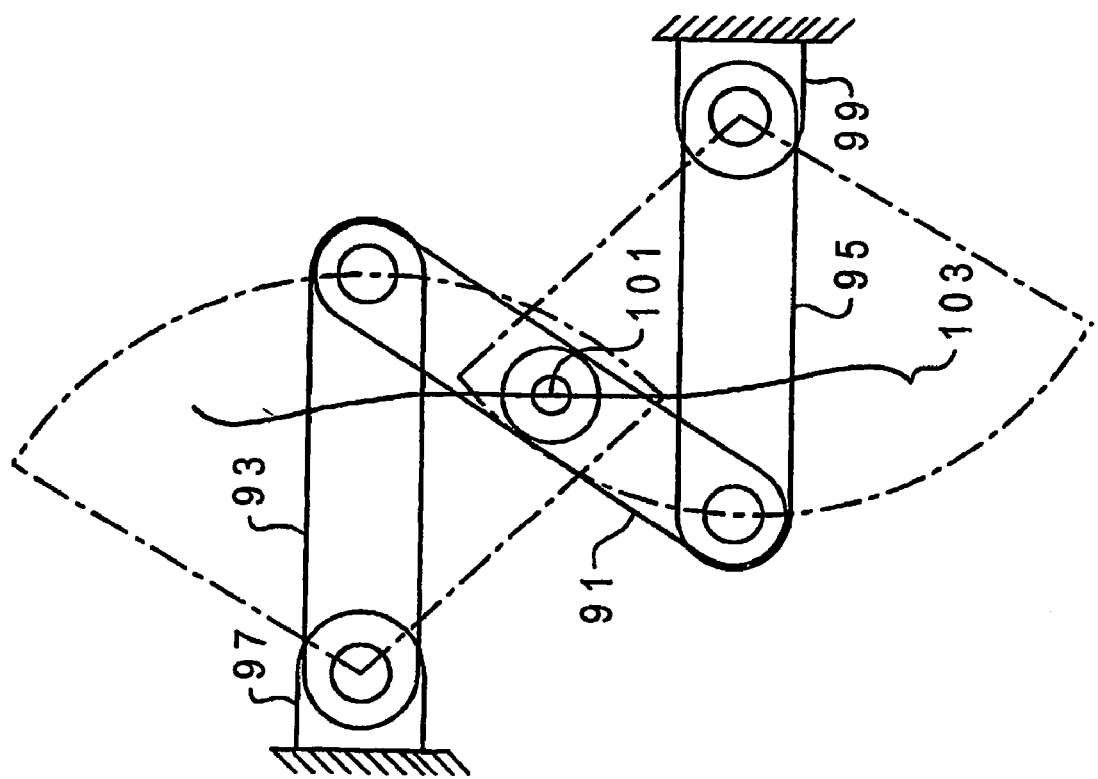
FIG. 4 is a schematic of the stepped mixing linkage of the rotorcraft control system with stepped mixing linkage according to the present invention.

Referring now to FIG. 4 in the drawings, stepped mixing linkage 53 is illustrated. Stepped mixing linkage 53 generates a sinusoidal output as a result of being a modified Watts linkage. Stepped mixing linkage 53 includes a short floating link 91 supported by two other short links 93 and 95, which are grounded on grounded pivots 97 and 99, respectively. Motion of a reference point 101 located at the center of floating link 73 is constrained to a straight line within limits before the motion of reference point 101 diverges, as is shown by line of motion 103.

The sinusoid component of stepped mixing linkage 53 uses what would generally be considered a very poor Watts linkage design. Stepped mixing linkage 53 is intentionally designed with the ratio of the length of supporting links 93 and 95 to the length of floating link 91 as small as possible. This small ratio results in a very small range of straight-line motion. Beyond this small range of straight-line motion, reference point 101 follows a sinusoidal path, due to the kinematics of the modified Watts linkage. This sinusoidal motion provides a first component of the output of stepped mixing linkage 53.

A second component of the output of stepped mixing linkage 53 is a combination of rotation of the sinusoidal output with a small ramped output. The rotation is accomplished by pivotally coupling supporting links 93 and 95 of stepped mixing linkage 53 to torque tube 59 at a selected angle to lateral output link 59. Forward and aft motion is input to stepped mixing linkage 53 by the motion of torque tube 59 relative to fixed ground link 62. The small ramped output is added by angling lateral output link 59 to provide a proportional lateral output with forward and aft cyclic input. The combination of these linkages creates a stepped lateral output as cyclic 55 is moved forward, and an opposite lateral output as cyclic 55 is moved aft.

Figure 5:
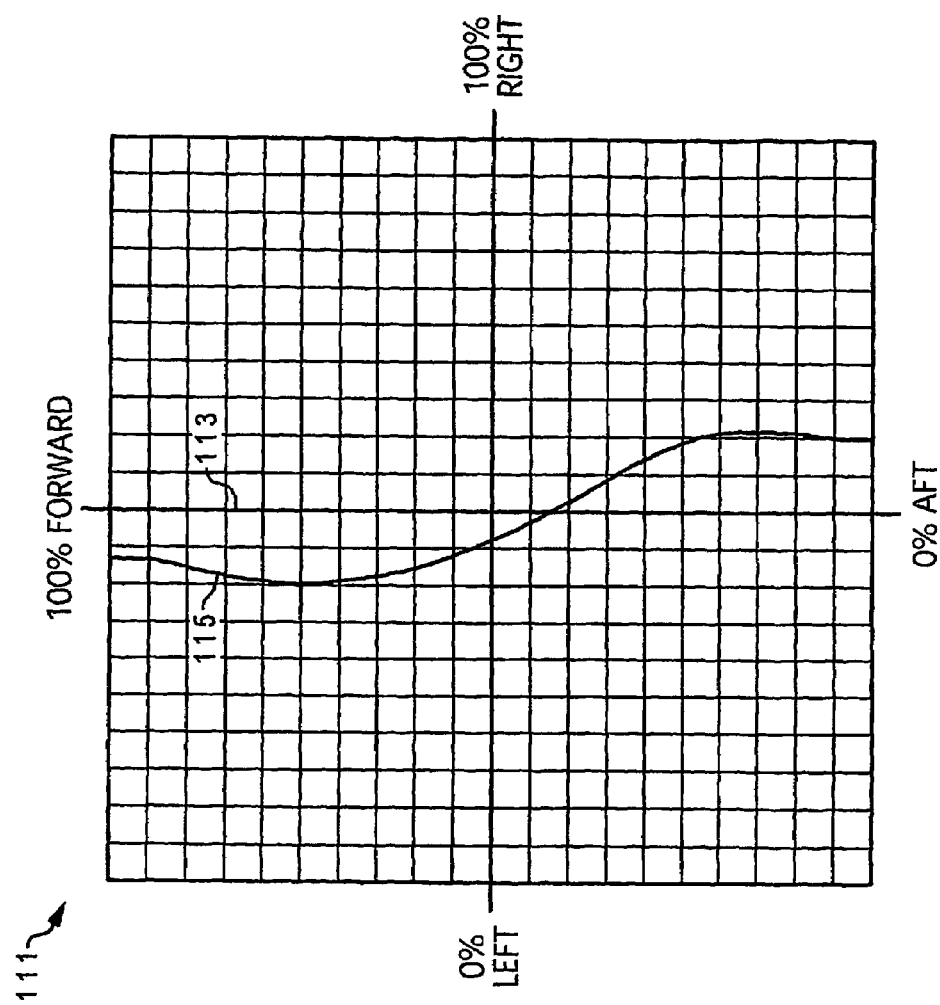
FIG. 5 is a comparative plot of the lateral outputs associated with forward and aft movement of the cyclic control systems of FIGS. 1 and 2.

Referring now to FIG. 5 in the drawings, a comparative plot 111 of the lateral outputs associated with forward and aft movement of the cyclic control systems of FIGS. 1 and 2 is illustrated. Plot 111 is a plot of forward-aft cyclic position versus left-right output value. As is shown, when lateral cyclic output is plotted against a forward-aft cyclic input without stepped mixing linkage 53, a straight-line curve 113 is produced. On the other hand, when lateral cyclic output is plotted against a forward-aft cyclic input with stepped mixing linkage installed, a modified stepped curve 115 is produced. The shape of curve 115 consists of a stepped lateral output as the cyclic is moved forward, and an opposite lateral output as the cyclic is moved aft. Curve 115 is created by the mechanical mixing of two kinematic linkage components.

Figure 6:
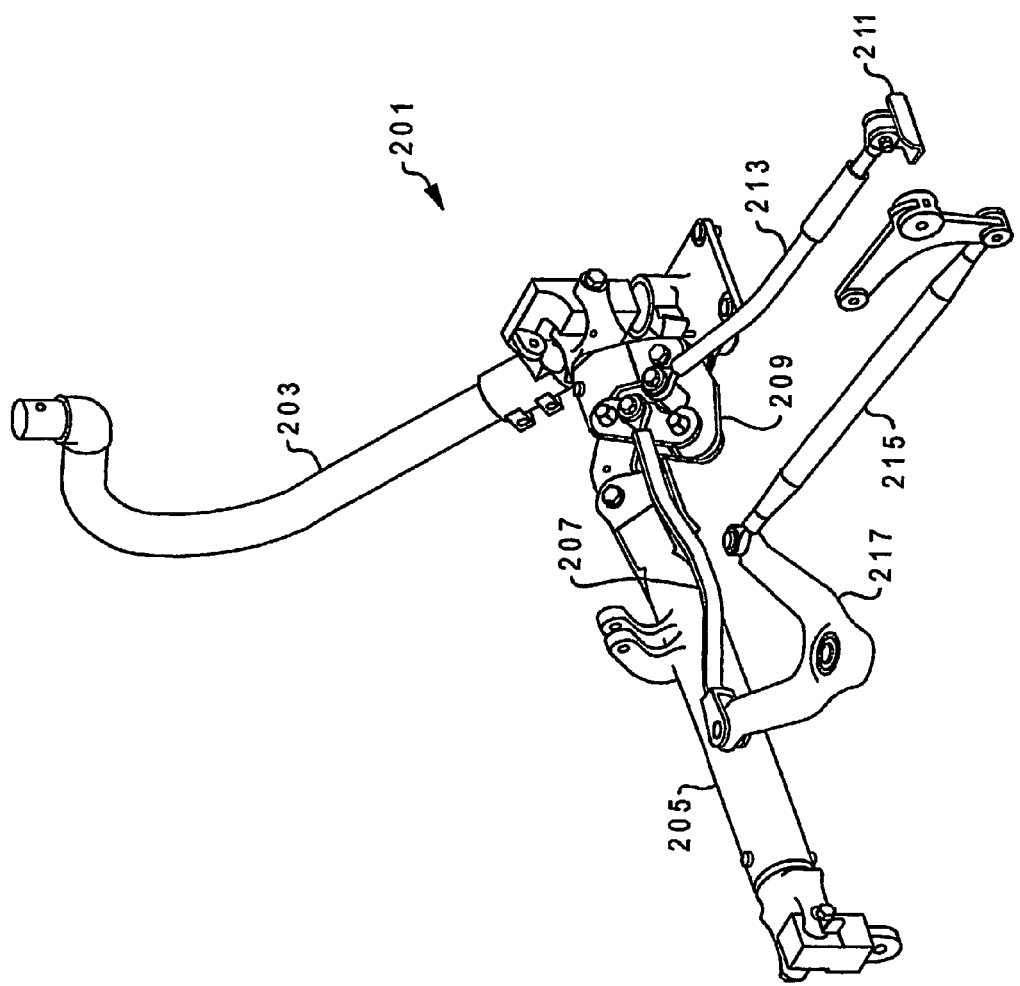
FIG. 6 is perspective view of a mechanical design of the rotorcraft control system with stepped mixing linkage according to the present invention.
Figure 7:
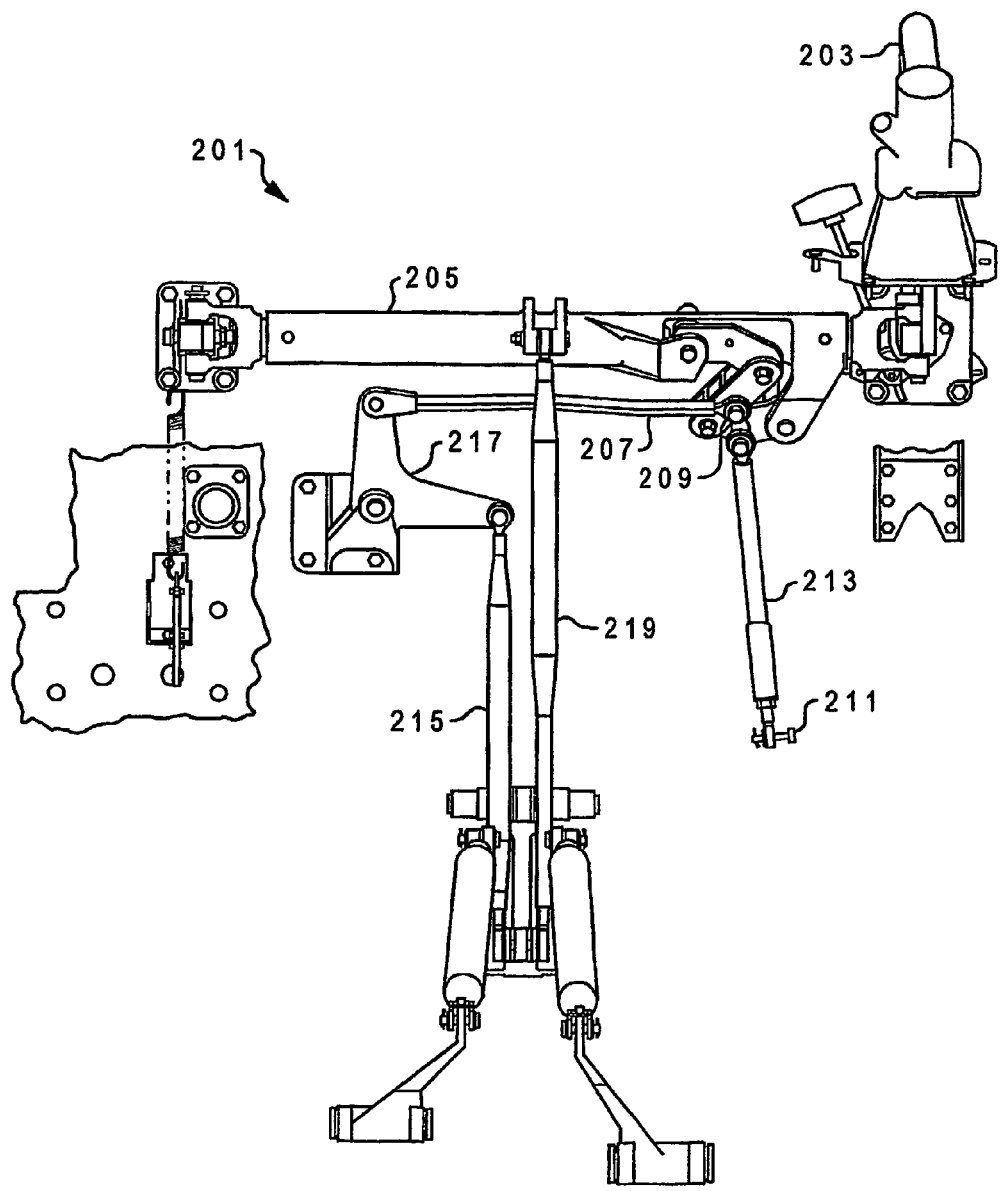
FIG. 7 is a top plan view of the rotorcraft control system with stepped mixing linkage according to the present invention shown as installed on a rotorcraft.

Referring now to FIGS. 6 and 7 in the drawings, the preferred embodiment of a mechanical design of rotorcraft control system with stepped mixing linkage 51 according to the present invention is illustrated. In FIG. 6, control system 51 is shown as a control system 201. In FIG. 7, control system 201 is illustrated as installed on a rotorcraft. Control system 201 includes a cyclic 203 for receiving directional commands from a pilot. Cyclic 203 is connected to a main rotor (not shown) through the system of bellcranks and links described above. Cyclic 203 is pivotally coupled to a torque tube 205. Torque tube 205 is pivotally coupled to a lateral output link 207 via a stepped mixing linkage 209. Stepped mixing linkage 209 is grounded to a fuselage 211 by a ground link 213.

Lateral output link 207 is pivotally coupled to a left-right output link 215 via a bellcrank 217. Torque tube 205 is also pivotally coupled to a forward-aft output link 219. Moving cyclic 203 changes the pitch of the rotor blades, which causes the main rotor to tilt in the commanded direction.

It will be appreciated that the present invention may be used on rotorcraft of original manufacture, or may be installed onto existing rotorcraft as a retrofit application.

It is apparent that an invention with significant advantages has been described and illustrated. Although the present invention is shown in a limited number of forms, it is not limited to just these forms, but is amenable to various changes and modifications without departing from the spirit thereof.

The invention claimed is:

1. A control system for a rotorcraft comprising:
   a cyclic for receiving pilot input commands;
   a torque tube pivotally coupled to the cyclic;
   a forward-aft output link pivotally coupled to the torque tube for transmitting forward-aft pilot input commands to a main rotor;
   a stepped mixing linkage pivotally coupled to the torque tube;
   a ground link pivotally coupled between the stepped mixing linkage and a grounded structure;
   a lateral output link pivotally coupled to the stepped mixing linkage; and
   a left-right output link pivotally coupled to the lateral output link for transmitting left-right pilot input commands to the main rotor;
   wherein the stepped mixing linkage, the ground link, and the lateral output link are configured to generate a selected lateral sinusoidal output, a selected rotation of the sinusoidal output, and a selected ramped output in response to each forward-aft cyclic input command.

2. The control system according to claim 1, wherein the stepped mixing linkage generates a selected left lateral output in response to a selected forward cyclic input, and the stepped mixing linkage generates a selected right lateral output in response to a selected aft cyclic input.

3. The control system according to claim 1, wherein the stepped mixing linkage comprises:
   two supporting links pivotally coupled to the torque tube; and
   a floating link pivotally coupled between the two supporting links, the floating link having a central reference point;
   wherein the ratio of the lengths of the two supporting links to the length of the floating link is small, thereby generating the selected lateral sinusoidal output.

4. The control system according to claim 3, wherein the two supporting links are pivotally coupled to the torque tube at a selected angle to the lateral output link, thereby generating the selected rotation of the sinusoidal output.

5. The control system according to claim 3, wherein the lateral output link is angled relative to the torque tube, thereby generating the ramped output.

6. The control system according to claim 3, wherein the support links are pivotally coupled to the torque tube, such that their pivot points form a parallelogram;
   wherein one of the support links is pivotally coupled to the ground link; and
   wherein the lateral output link is pivotally coupled to the stepped mixing at the reference point and disposed at an angle to the support links;
   thereby generating the selected rotation of the sinusoidal output and the selected ramped output.

7. The control system according to claim 1, wherein the stepped mixing linkage comprises:
   a Watts linkage having two supporting links and one floating link, wherein the ratio of the lengths of the two supporting links to the length of the floating link is small, thereby generating the selected lateral sinusoidal output.

8. The control system according to claim 1, wherein the stepped mixing linkage comprises:
   two supporting links pivotally coupled to the torque tube; and
   a floating link pivotally coupled between the two supporting links, the floating link having a central reference point;
   wherein the lengths of the two supporting links are about the same as the length of the floating link, thereby generating the selected lateral sinusoidal output.

9. A rotorcraft comprising:
   a fuselage;
   a drive means carried by the fuselage;
   a main rotor coupled to the drive means; and
   a control system comprising:
      a cyclic for receiving pilot input commands;
      a torque tube pivotally coupled to the cyclic;
      a forward-aft output link pivotally coupled to the torque tube for transmitting forward-aft pilot input commands to a main rotor;
      a stepped mixing linkage pivotally coupled to the torque tube;
      a ground link pivotally coupled between the stepped mixing linkage and a grounded structure;
      a lateral output link pivotally coupled to the stepped mixing linkage; and
      a left-right output link pivotally coupled to the lateral output link for transmitting left-right pilot input commands to the main rotor;
   wherein the stepped mixing linkage, the ground link, and the lateral output link are configured to generate a selected lateral sinusoidal output, a selected rotation of the sinusoidal output, and a selected ramped output in response to each forward-aft pilot input command.

10. The rotorcraft according to claim 9, wherein the control system generates a selected left lateral output in response to a selected forward cyclic input and, a selected right lateral output in response to a selected aft cyclic input.

11. The control system according to claim 9, wherein the stepped mixing linkage comprises:
   two supporting links pivotally coupled to the torque tube; and
   a floating link pivotally coupled between the two supporting links, the floating link having a central reference point;
   wherein the ratio of the lengths of the two supporting links to the length of the floating link is small, thereby generating the selected lateral sinusoidal output.

12. The control system according to claim 11, wherein the two supporting links are pivotally coupled to the torque tube at a selected angle to the lateral output link, thereby generating the selected rotation of the sinusoidal output.

13. The control system according to claim 11, wherein the lateral output link is angled relative to the torque tube, thereby generating the ramped output.

14. The control system according to claim 11, wherein the support links are pivotally coupled to the torque tube, such that their pivot points form a parallelogram;
   wherein one of the support links is pivotally coupled to the ground link; and wherein the lateral output link is pivotally coupled to the stepped mixing at the reference point and disposed at an angle to the support links;

thereby generating the selected rotation of the sinusoidal output and the selected ramped output.

15. A stepped mixing linkage for use on an existing rotorcraft having a control system including a cyclic for receiving pilot input commands, a torque tube pivotally coupled to the cyclic, a forward-aft output link pivotally coupled to the torque tube for transmitting forward-aft pilot input commands to a main rotor, and a left-right output link for transmitting left-right input commands to the main rotor, the stepped mixing linkage comprising:

two supporting links adapted for pivotal coupling to the torque tube;

a floating link pivotally coupled between the two supporting links, the floating link having a central reference point;

a lateral output link operatively associated with the floating link for transmitting left-right input commands through the left-right output link to the main rotor; and a ground link pivotally coupled between one of the supporting links, the ground link being adapted for pivotal coupling to a grounded structure on the existing rotorcraft;

wherein the ratio of the lengths of the two supporting links to the length of the floating link is small, thereby generating a selected lateral sinusoidal output, a selected rotation of the sinusoidal output, and a selected ramped output in response to each forward-aft pilot input command.

16. A method of eliminating the cross-coupling effect in a rotorcraft comprising the steps of:

providing a cyclic for receiving pilot input commands and transmitting the pilot input commands to a main rotor;

pivotally coupling a torque tube to the cyclic;

pivotally coupling a forward-aft output link to the torque tube;

pivotally coupling a stepped mixing linkage to the torque tube;

providing a stepped mixing linkage having two supporting links, a floating link pivotally coupled between the two supporting links, and a central reference point on the floating link;

pivotally coupling the stepped mixing linkage to the torque tube;

pivotally coupling a ground link between one of the supporting links and a grounded structure;

pivotally coupling a lateral output link to the floating link at the reference point; and pivotally coupling a left-right output link pivotally the lateral output link through a bellcrank; and generating a selected lateral sinusoidal output, a selected rotation of the sinusoidal output, and a selected ramped output with the stepped mixing linkage, the ground link, and the lateral output link in response to each forward-aft pilot input command.

* * * * *